(12) United States Patent
Uratsuka

(10) Patent No.: US 12,504,098 B2
(45) Date of Patent: Dec. 23, 2025

(54) VALVE DEVICE WITH HEATER

(71) Applicant: AISAN KOGYO KABUSHIKI KAISHA, Obu (JP)

(72) Inventor: Takafumi Uratsuka, Nagoya (JP)

(73) Assignee: AISAN KOGYO KABUSHIKI KAISHA (JP)

(*) Notice: Subject to any disclaimer, the term of this patent is extended or adjusted under 35 U.S.C. 154(b) by 0 days.

(21) Appl. No.: 18/381,815

(22) Filed: Oct. 19, 2023

(65) Prior Publication Data

US 2024/0133487 A1 Apr. 25, 2024
US 2024/0229972 A9 Jul. 11, 2024

(30) Foreign Application Priority Data

Oct. 24, 2022 (JP) .................. 2022-169811

(51) Int. Cl.
F16K 49/00 (2006.01)
F16K 7/14 (2006.01)
F16K 31/06 (2006.01)

(52) U.S. Cl.
CPC ............. *F16K 49/00* (2013.01); *F16K 7/14* (2013.01); *F16K 31/0672* (2013.01); *Y10T 137/6416* (2015.04)

(58) Field of Classification Search
CPC ...... F16K 49/00; F16K 49/002; F16K 49/005; F16K 7/14; F16K 31/0672; Y10T 137/6416; Y10T 137/6606
USPC .................. 137/341, 334; 251/369
See application file for complete search history.

(56) References Cited

U.S. PATENT DOCUMENTS

| | | | | |
|---|---|---|---|---|
| 1,988,289 | A | * | 1/1935 | Wittemann .......... G05D 23/275 165/47 |
| 3,168,899 | A | * | 2/1965 | Mellett ................. F16K 49/002 137/341 |
| 3,658,085 | A | * | 4/1972 | Cannella ................... F16T 1/14 137/341 |

(Continued)

FOREIGN PATENT DOCUMENTS

CN 211045598 U 7/2020
JP 2005-259494 A 9/2005

(Continued)

*Primary Examiner* — Kenneth Rinehart
*Assistant Examiner* — Jonathan J Waddy
(74) *Attorney, Agent, or Firm* — Jason A. Smith; Shumaker, Loop & Kendrick, LLP

(57) ABSTRACT

A valve device that includes a housing; an inlet passage disposed inside the housing and into which a fluid is introduced; a first discharging unit disposed at a downstream end of the inlet passage; an outlet passage disposed inside the housing, communicating with the first discharging unit, extending in a direction different from the inlet passage, and configured to discharge the fluid outside; a communication chamber disposed between the first discharging unit and the outlet passage and communicating with these members; a valve seat disposed on the first discharging unit; a valve body configured to contact the valve seat to open and close the first discharging unit; a heater; and a heat transfer plate disposed inside the housing, extending along the inlet passage, and configured to transfer heat from the heater to the fluid. The inlet passage may approach closer to the outlet passage toward the first discharging unit side.

3 Claims, 2 Drawing Sheets

(56) References Cited

U.S. PATENT DOCUMENTS

| | | | | |
|---|---|---|---|---|
| 5,531,245 | A | * | 7/1996 | Sparks .................. F16K 49/002 |
| | | | | 137/341 |
| 6,752,387 | B1 | * | 6/2004 | Nishizato ............... B01D 3/346 |
| | | | | 261/DIG. 65 |
| 7,770,592 | B2 | * | 8/2010 | Knight .............. H01M 8/04156 |
| | | | | 137/341 |
| 8,186,374 | B2 | | 5/2012 | Hatta |
| 8,950,426 | B2 | * | 2/2015 | Yewdall .................. E03C 1/044 |
| | | | | 4/678 |
| 11,127,959 | B2 | | 9/2021 | Yoshitomi et al. |
| 2003/0116193 | A1 | * | 6/2003 | Fukuda ................. F16K 49/002 |
| | | | | 137/341 |
| 2006/0144443 | A1 | * | 7/2006 | Yewdall .................... F16K 7/16 |
| | | | | 137/341 |
| 2007/0209710 | A1 | * | 9/2007 | Gottsmann ........... F16K 49/002 |
| | | | | 137/341 |
| 2010/0071781 | A1 | * | 3/2010 | Hatta .................... F16K 49/002 |
| | | | | 137/334 |
| 2018/0216506 | A1 | * | 8/2018 | Maas .................... F16K 49/002 |
| 2020/0199753 | A1 | * | 6/2020 | Hidaka ..................... B01B 1/06 |
| 2020/0300384 | A1 | * | 9/2020 | Iijima ...................... F16K 41/10 |

FOREIGN PATENT DOCUMENTS

| | | |
|---|---|---|
| JP | 2008-270151 A | 11/2008 |
| JP | 2009-110849 A | 5/2009 |
| JP | 2020-187841 A | 11/2020 |

* cited by examiner

VALVE DEVICE WITH HEATER

REFERENCE TO RELATED APPLICATION

This application claims priority to Japanese Patent Application No. 2022-169811 filed on Oct. 24, 2022, the contents of which are hereby incorporated by reference into the present application.

TECHNICAL FIELD

The description herein discloses an art related to valve devices.

BACKGROUND ART

JP 2008-270151 A (hereinbelow termed Patent Document 1) describes a valve device configured to open and close a fluid channel. The valve device of Patent Document 1 is used in a vehicle mounted with a fuel cell system. In Patent Document 1, the valve device (valve body) and a heater (heat generating member) are integrated to thaw frozen water generated in the fluid channel. In Patent Document 1, the valve device and the heater are integrated to configure them as a thermally integrated structure to accelerate thawing process of the frozen water. Specifically, in the valve device of Patent Document 1, an inlet passage (fluid introducing passage upstream of the valve body) extends toward the valve body that is located on a higher side along a vertical direction (direction of gravity). On the other hand, the heater is located below the inlet passage in the vertical direction. In Patent Document 1, water in a liquid state (fluid that is not frozen) is dripped downward (to a vicinity of the heater) and is collected in the vicinity of the heater to reduce thawing time of the frozen water.

SUMMARY

The valve device of Patent Document 1 provides a countermeasure solely for thawing the frozen water generated from the water (in the liquid state) remaining in the inlet passage. However, in a valve device that opens and closes a fluid channel, a fluid may freeze in an outlet passage (fluid discharging passage downstream of a valve body) as well. For example, the fluid may remain in the outlet passage (just) after the valve body has been closed. When the fluid moves in the outlet passage in a state where the valve body is closed, a negative pressure is applied to an upstream side of the fluid and a liquid film may be generated in the outlet passage. In the valve device of Patent Document 1, a frozen liquid generated from the water remaining in the outlet passage (liquid film) cannot be thawed efficiently. The valve device of Patent Document 1 cannot be said as being able to efficiently thaw the frozen liquid generated in the fluid channel. The description herein provides a valve device configured to efficiently thaw a frozen liquid generated in a fluid channel.

A first aspect disclosed herein is a valve device configured to open and close a fluid channel. The valve device may comprise: a housing; an inlet passage disposed inside the housing and into which a fluid is introduced from outside; a first discharging unit disposed at a downstream end of the inlet passage; an outlet passage disposed inside the housing, communicating with the first discharging unit, extending in a direction different from the inlet passage, and configured to discharge the fluid outside; a communication chamber disposed between the first discharging unit and the outlet passage and communicating with the first discharging unit and the outlet passage; a valve seat disposed on the first discharging unit; a valve body configured to contact the valve seat and to open and close the first discharging unit; a heater; and a heat transfer plate disposed inside the housing, extending along the inlet passage, and configured to transfer heat from the heater to the fluid. The inlet passage may approach closer to the outlet passage toward the first discharging unit side.

A second aspect disclosed herein is the valve device according to the first aspect as above, in which the inlet passage may extend in a substantially horizontal direction, and at least a part of the heat transfer plate may be arranged below the inlet passage. A "substantially horizontal direction" described herein refers to directions within a range of ±30 degrees from a direction perpendicular to the direction of gravity (precise horizontal direction).

A third aspect disclosed herein is the valve device according to the first or second aspect, in which an end of the heat transfer plate may be located between an end of the inlet passage and the outlet passage.

According to the first aspect, a fluid that froze (hereinbelow termed "frozen fluid") can be thawed not only in the inlet passage (fluid introducing passage upstream of the valve body) being a fluid introducing passage but also in the outlet passage (fluid discharging passage downstream of the valve body) being a fluid discharging passage. That is, the frozen fluid can be thawed over an entirety of the fluid channel in the valve device. Even if a frozen fluid is generated inside the fluid channel in a low-temperature environment, the frozen fluid can efficiently be thawed, and functions of the valve device can be suppressed from being lost.

Further, in the first aspect, heat from the heater is transmitted to the fluid channel using the heat transfer plate. Due to this, a degree of positional freedom in arranging the heater increases. Specifically, the heater may be embedded inside the housing or may be arranged outside the housing. Further, by using the heat transfer plate, cost reduction for the valve device can be achieved. For example, when the heater is to be arranged along the fluid channel to transmit its heat over the entirety of the fluid channel, a size (length) of the heater becomes longer when a length of the fluid channel becomes longer. On the other hand, when the heat transfer plate is used, the length of the heat transfer plate can be adjusted in accordance with the length of the fluid channel. Typically, the heat transfer plate is a metal plate, and thus is cheaper than the heater. Due to this, according to the first aspect, as compared to a configuration of directly heating the fluid channel using the heater without using the heat transfer plate, the cost for the device can be reduced.

According to the second aspect, the frozen fluid in the fluid channel (inlet passage) can be thawed at an early point in time. The fluid remaining in the inlet passage gathers at a bottom of the inlet passage (on a lower side inside the passage). Due to this, by arranging the heat transfer plate below the inlet passage, heat can efficiently be transmitted to the frozen fluid, and the frozen fluid can be thawed at an early point in time. Further, by arranging the heat transfer plate at a position where the fluid is likely to gather, a size of the heat transfer plate can be reduced and a number thereof can be reduced, and cost for the valve device can therefore be reduced.

According to the third aspect, heat can efficiently be applied to the fluid remaining in the outlet passage (frozen fluid generated by a liquid film formed in the outlet passage having frozen) as well. As a result, the frozen fluid generated in the fluid channel can efficiently be thawed. Further, according to the third aspect, when the housing is made of resin, a degree of positional freedom in arranging the inlet passage and the outlet passage can be increased. When a structure having voids such as fluid channels is to be fabricated using a resin material, it is not desirable to set a large distance between the voids (set a large resin thickness). In other words, it is preferable to eliminate a thick portion when employing resin molding. In the third aspect, a thick portion of the housing can be divided by the heat transfer plate and thus be reduced of its thickness, thus formation of a thick portion in the housing can be suppressed even when a distance between the inlet passage and the outlet passage becomes long.

DETAILED DESCRIPTION (Fuel Cell System Using Valve Device)

Figure 1:
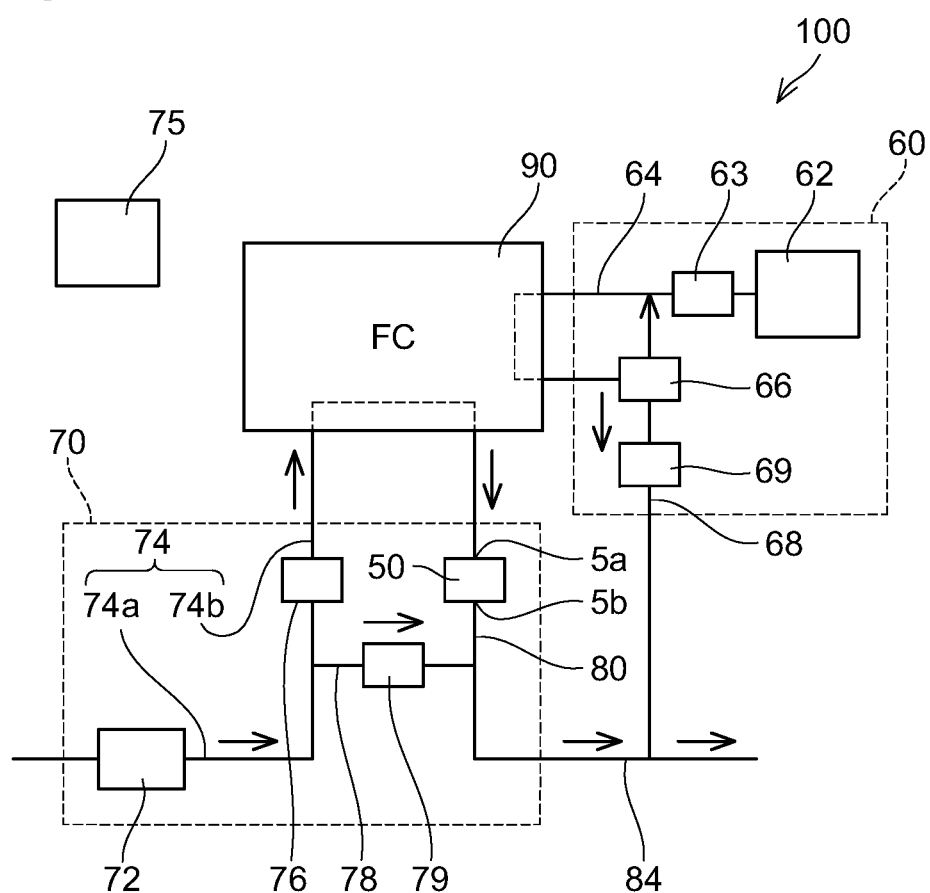
FIG. 1 shows a schematic view of a fuel cell system including a valve device.

Firstly, a fuel cell system 100 that uses a valve device disclosed herein will be described with reference to FIG. 1. The fuel cell system 100 is suitably mounted on a vehicle (fuel cell vehicle). The fuel cell system 100 comprises a fuel cell stack 90, a hydrogen line 60 for supplying hydrogen gas to the fuel cell stack 90, an air line 70 for supplying air gas (external air) to the fuel cell stack 90, and a controller 75. The fuel cell system 100 is configured to generate electric power by using the hydrogen gas supplied from the hydrogen line 60 and oxygen gas (air gas) supplied from the air line 70.

The hydrogen line 60 comprises a hydrogen gas tank 62, a hydrogen supply passage 64, and a hydrogen discharging passage 68. A pressure reduction valve 63 is disposed on the hydrogen supply passage 64. A pressure of the hydrogen gas supplied from the hydrogen gas tank 62 to the hydrogen supply passage 64 is adjusted by the pressure reduction valve 63. An injector (not shown) is disposed downstream of the pressure reduction valve 63, and the hydrogen gas supplied from the hydrogen gas tank 62 is supplied to the fuel cell stack 90 by the injector. A gas-liquid separator 66 and a hydrogen discharging valve 69 are disposed on the hydrogen discharging passage 68. The hydrogen discharging valve 69 is an example of a valve device. The hydrogen discharging valve 69 is disposed downstream of the gas-liquid separator 66. The hydrogen gas supply to the fuel cell stack 90 is controlled by the controller 75. That is, the controller 75 controls on/off of the hydrogen supply passage 64 and a flow rate of the hydrogen gas flowing through the hydrogen supply passage 64.

Hydrogen gas (hydrogen off gas) discharged from the fuel cell stack 90 is supplied to the gas-liquid separator 66. Hydrogen gas contained in the hydrogen off gas is extracted in the gas-liquid separator 66. The hydrogen gas extracted in the gas-liquid separator 66 is returned to the hydrogen supply passage 64 by a hydrogen circulation pump (not shown) and is supplied to the fuel cell stack 90. On the other hand, remainder of the off gas after having extracted the hydrogen gas in the gas-liquid separator 66 is discharged to the hydrogen discharging passage 68 and is discharged out of the fuel cell system 100 through a discharging pipe 84. The discharging pipe 84 is further connected to an air discharging passage 80 to be described later. A flow rate in the hydrogen discharging passage 68 is adjusted by the hydrogen discharging valve 69. On/off of the hydrogen discharging passage 68 and a flow rate of the hydrogen off gas flowing through the hydrogen discharging passage 68 are also controlled by the controller 75. The remainder of the off gas after having extracted the hydrogen gas in the gas-liquid separator 66 contains generated water that was generated in the fuel cell system 100.

The air line 70 comprises a compressor 72, an air supply passage 74, an air discharging passage 80, a bypass passage 78, an air supply valve 76, an air discharging valve 50, and a bypass valve 79. The compressor 72 compresses and feeds external air as the air gas into the air supply passage 74. Further, an air cleaner (not shown) is disposed upstream of the compressor 72. Due to this, clean air gas is supplied to the air supply passage 74. The air supply passage 74 connects the fuel cell stack 90 and the compressor 72. The air supply valve 76 is disposed on the air supply passage 74. Specifically, the air supply passage 74 comprises an upstream air supply passage 74a that connects the compressor 72 and the air supply valve 76 and a downstream air supply passage 74b that connects the air supply valve 76 and the fuel cell stack 90. When the compressor 72 is driven and the air supply valve 76 communicates the upstream air supply passage 74a with the downstream air supply passage 74b, the external air is supplied to the fuel cell stack 90 as the air gas. Here, an intercooler (not shown) is disposed between the compressor 72 and the air supply valve 76. The air gas of which temperature is adjusted (cooled) by the intercooler is supplied to the fuel cell stack 90.

The air discharging passage 80 is connected to the fuel cell stack 90 and discharges air off gas from the fuel cell stack 90. The discharged air off gas is discharged outside the fuel cell system 100 through the discharging pipe 84. The air-discharging valve 50 is disposed on the air discharging passage 80. The air-discharging valve 50 is a butterfly valve, and is controlled by the controller 75. An amount of the air off gas is adjusted by adjusting an opening degree of the air-discharging valve 50. The air off gas contains generated water generated in the fuel cell system 100.

The bypass passage 78 connects the air supply passage 74 and the air discharging passage 80. Specifically, one end of the bypass passage 78 is connected to the upstream air supply passage 74a and the other end thereof is connected to the air discharging passage 80 at a point downstream of the air-discharging valve 50. The bypass valve 79 is disposed on the bypass passage 78, and when the bypass valve 79 opens, the air gas in the air supply passage 74 is supplied to the air discharging passage 80.

(Hydrogen Discharging Valve)

The hydrogen discharging valve 69 will be described with reference to FIG. 2. The hydrogen discharging valve 69 adjusts the flow rate of the remainder of the off gas after having extracted the hydrogen gas in the gas-liquid separator 66 (generated water). The hydrogen discharging valve 69 comprises a housing 30 through which the generated water flows and a valve unit 40 configured to open and close a channel inside the housing 30. The housing 30 is constituted of resin, and comprises a fluid introducing unit 30a in which an inlet passage 38 is defined and a fluid discharging unit 30b in which an outlet passage 32 is defined. The fluid introducing unit 30a is fixed to the gas-liquid separator 66. A coupling hose (not shown) that constitutes the hydrogen discharging passage 68 is attached to the fluid discharging unit 30b. Further, a communication chamber 20 is disposed between the inlet passage 38 and the outlet passage 32. The generated water introduced into the hydrogen discharging valve 69 (into the housing 30) from outside the hydrogen discharging valve 69 (gas-liquid separator 66) flows through the inlet passage 38, the communication chamber 20, and the outlet passage 32 and is discharged out of the hydrogen discharging valve 69 (hydrogen discharging passage 68).

The inlet passage 38 extends in a substantially horizontal direction, and approaches closer to the outlet passage 32 toward its downstream end surface 38a. A first discharging unit 36 is disposed at a downstream end of the inlet passage 38 (in a vicinity of an end surface 38a). Due to this, the inlet passage 38 can be regarded as that it is disposed to approach closer to the outlet passage 32 at its portions on a first discharging unit 36 side. The first discharging unit 36 is disposed on a sidewall of the inlet passage 38 and opens into the communication chamber 20. The first discharging unit 36 has a smaller channel area than the inlet passage 38 and has an orifice shape. A direction along which the first discharging unit 36 extends and a direction along which the inlet passage 38 extends are different. The first discharging unit 36 extends in a substantially vertical direction. The first discharging unit 36 protrudes from a bottom surface 22 of the communication chamber 20 to above the communication chamber 20 (upper side along the vertical direction). Further, an end surface of the first discharging unit 36 constitutes a valve seat 34 on which a valve body 18 to be described later is to sit. The generated water introduced into the inlet passage 38 moves inside the inlet passage 38 in the horizontal direction, moves upward through the first discharging unit 36, and is then discharged into the communication chamber 20.

An upstream end 24 of the outlet passage 32 communicates with the communication chamber 20. A direction along which the outlet passage 32 extends also differs from the direction along which the inlet passage 38 extends. The outlet passage 32 extends in the substantially vertical direction from its upstream end 24 toward a second discharging unit 33. The outlet passage 32 communicates with the inlet passage 38 via the communication chamber 20 and the first discharging unit 36. Due to this, the generated water guided into the outlet passage 32 from the communication chamber 20 moves downward inside the outlet passage 32, and is discharged outside the hydrogen discharging valve 69 (hydrogen discharging passage 68) from a second discharging unit 33 disposed at a downstream end of the outlet passage 32.

A heat transfer plate 42 and a heater 44 are arranged below the inlet passage 38. The heat transfer plate 42 and the heater 44 are embedded in the housing 30. Heat from the heater 44 is applied to the heat transfer plate 42. The heat transfer plate 42 extends in the substantially horizontal direction along the inlet passage 38, and its end 42a is bent and extends upward. The end 42a of the heat transfer plate 42 is interposed between the end surface 38a of the inlet passage 38 and a sidewall of the outlet passage 32. The heater 44 is disposed below the heat transfer plate 42 and is in contact with the heat transfer plate 42. The heater 44 is connected to an external power source via a cable (not shown).

The valve unit 40 is fixed above the housing 30. The valve unit 40 comprises a cylindrical fixation base 4, an electromagnetic coil 10 disposed on an outer circumference of the fixation base 4, an attraction member 8 disposed inside the fixation base 4, a plunger 14 disposed coaxially with the attraction member 8 inside the fixation base 4, a mount plate 16 fixed to the fixation base 4, a valve body 18 fixed to the plunger 14 and the mount plate 16, and a cover 6.

The electromagnetic coil 10 is disposed in a recess defined in an outer circumferential surface of the fixation base 4. A size of an upper end of the attraction member 8 is greater than a cross-sectional size (inner diameter) of the cylindrical fixation base 4. The upper end of the attraction member 8 contacts an upper end surface of the fixation base 4 and separates inside of the cylindrical fixation base 4 from outside. An O-ring 2 is disposed between the upper end of the attraction member 8 and an upper end surface of the fixation base 4, and this O-ring 2 seals the cylindrical fixation base 4. The attraction member 8 is a magnetic body, and a part thereof faces a part of the electromagnetic coil 10.

A coil spring 12 is disposed between the attraction member 8 and the plunger 14. The coil spring 12 is fixed to both the attraction member 8 and the plunger 14 and thereby suppresses these members from coming into contact with each other. The plunger 14 extends through a through hole defined at a center of the mount plate 16. A distal end of the plunger 14 (opposite end from the attraction member 8) has the valve body 18 fixed thereon. A size of the plunger 14 on a distal end side (its portion housed inside the communication chamber 20) is greater than a size of the through hole of the mount plate 16.

The valve body 18 is constituted of rubber and is in a diaphragm shape. A center portion 18a of the valve body 18 is fitted in the distal end of the plunger 14, and the valve body 18 and the plunger 14 are thereby fixed to each other. An outer peripheral portion 18c of the valve body 18 is fixed to the mount plate 16. A deformable portion 18b configured deformable compliant to an operation of the plunger 14 is disposed between the center portion 18a and the outer peripheral portion 18c.

The mount plate 16 is fixed to an upper surface of the housing 30. By fixing the mount plate 16 to the housing 30, the valve body 18 comes to face the valve seat 34. More specifically, the center portion 18a of the valve body 18 is pressed against the valve seat 34 (sits thereon) by a biasing force of the coil spring 12 (extension force), by which the first discharging unit 36 is closed. While the valve body 18 (center portion 18a) is seated on the valve seat 34, the inlet passage 38 and the outlet passage 32 are not communicated, thus the generated water will not be discharged from the hydrogen discharging valve 69. Further, the cover 6 is fixed to an upper surface of the mount plate 16, covers the fixation base 4 and the electromagnetic coil 10, and separates the fixation base 4 and the electromagnetic coil 10 from the outside.

when the electromagnetic coil 10 is electrically conducted, the attraction member 8 is magnetically excited and the plunger 14 is thereby attracted to the attraction member 8. That is, the plunger 14 is attracted toward the attraction member 8 by a magnetic excitation force of the attraction member 8 and moves upward by compressing the coil spring 12. When the plunger 14 moves upward, the center portion 18a of the valve body 18 moves upward together with the plunger 14, and the valve body 18 separates from the valve seat 34. When the valve body 18 separates from the valve seat 34, the inlet passage 38 communicates with the outlet passage 32 and the generated water is discharged from the hydrogen discharging valve 69.

As described above, the generated water introduced into the housing 30 flows through the inlet passage 38, the communication chamber 20, and the outlet passage 32. Due to this, even when the valve is closed, the generated water may remain in the fluid channel (inlet passage 38, communication chamber 20, and outlet passage 32). Specifically, the generated water remaining in the inlet passage 38

(including the first discharging unit 36) at the time when the valve was closed gathers on the bottom surface of the inlet passage 38 (lower portion). The generated water remaining in the communication chamber 20 at the time when the valve was closed gathers on the bottom surface 22 of the communication chamber 20. The generated water remaining in the outlet passage 32 at the time when the valve was closed is mostly discharged from the second discharging unit 33 by its own weight, however, due to an upstream side of the generated water having a negative pressure, the generated water may remain as a liquid film in the outlet passage 32.

The generated water that remained in the fluid channel when the valve was closed may become frozen fluid in the low-temperature environment. The frozen fluid in the communication chamber 20 does not significantly affect operation of the hydrogen discharging valve 69 since the first discharging unit 36 protrudes upward from the bottom surface 22 of the communication chamber 20. Specifically, since the frozen fluid is suppressed from covering a surface of the valve seat 34, the frozen fluid in the communication chamber 20 is suppressed from adhering the valve body 18 and the valve seat 34. On the other hand, the frozen fluids in the inlet passage 38 and in the outlet passage 32 significantly affect (adversely affect) the operation of the hydrogen discharging valve 69 since they may clog channels and decrease channel areas. However, in the hydrogen discharging valve 69, the head from the heater 44 is applied to the frozen fluids in the inlet passage 38 and in the outlet passage 32 by using the heat transfer plate 42, and thus the frozen fluid can be thawed accordingly. Alternatively, the generated water inside the inlet passage 38 and/or inside the outlet passage 32 can be suppressed from freezing (production of the frozen fluid is suppressed).

(Advantages of Hydrogen Discharging Valve)

In the hydrogen discharging valve 69, the heat transfer plate 42 extends along the inlet passage 38 below the inlet passage 38. Due to this, the heat from the heater can be transmitted to the entirety of the inlet passage 38 independent from the heater size or arranged position thereof, and further, the heat can efficiently be applied to the frozen fluid (or generated water). By disposing the heat transfer plate 42 along and below the inlet passage 38, thawing of the frozen fluid in the inlet passage 38 can efficiently be performed (or alternatively, generation of the frozen fluid can be efficiently suppressed).

Further, in the hydrogen discharging valve 69, the heat transfer plate 42 is arranged to approach closer to the outlet passage 32 along the inlet passage 38. Further, the end 42a of the heat transfer plate 42 is interposed between the inlet passage 38 and the outlet passage 32. Due to this, the heat transfer plate 42 can apply the heat not only to the frozen fluid in the inlet passage 38 but also to the frozen fluid in the outlet passage 32. The hydrogen discharging valve 69 does not have to independently provide a heat transfer plate (or heater) that applies heat to the frozen fluid in the inlet passage 38 and a heat transfer plate (or heater) that applies heat to the frozen fluid in the outlet passage 32, thus reduction in the number of components and cost can be realized.

Figure 2:
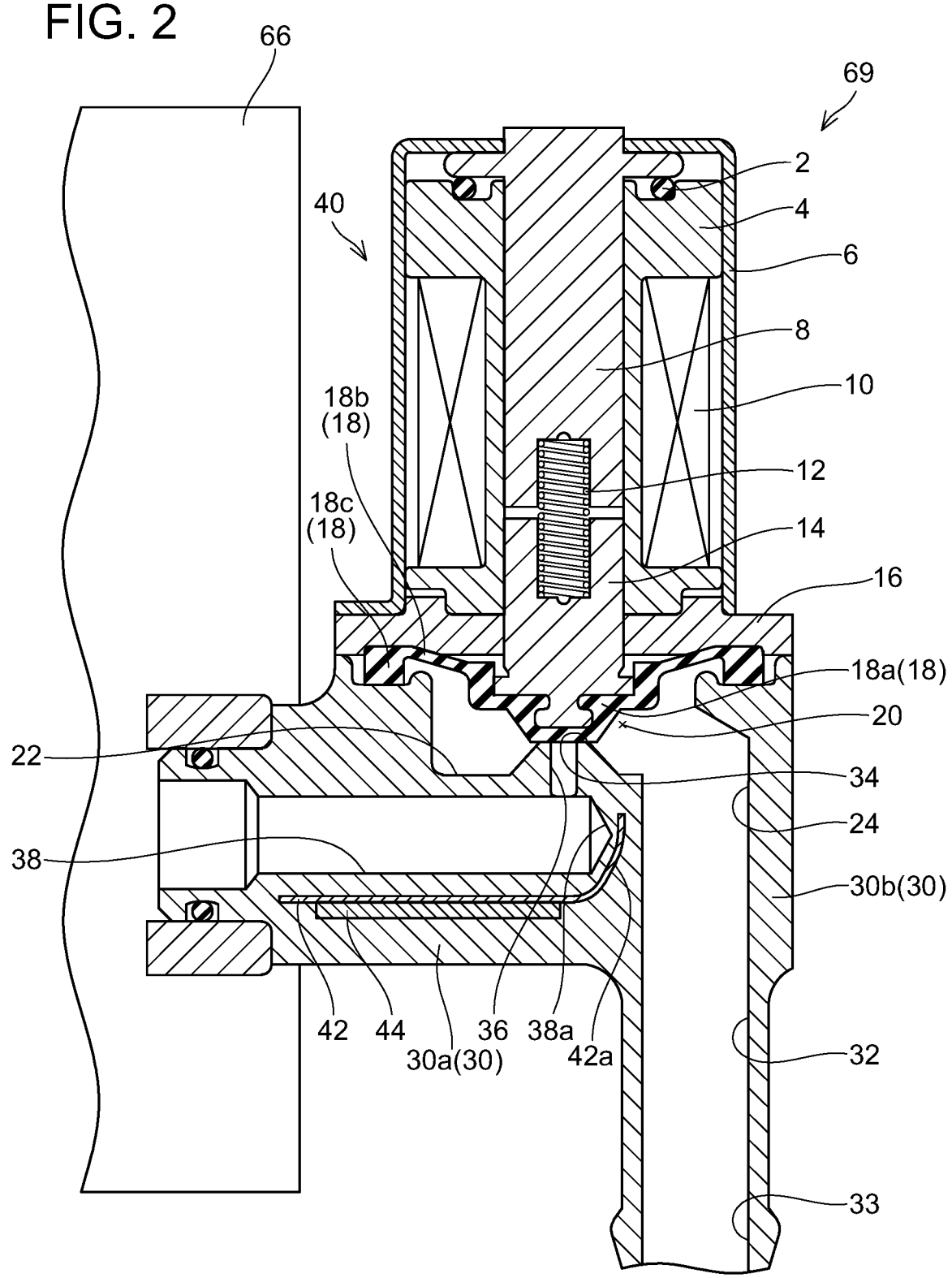
FIG. 2 shows a cross-sectional view of the valve device.

Further, as it is apparent from FIG. 2, in the hydrogen discharging valve 69, the end 42a of the heat transfer plate 42 separates the material (resin) between the end surface 38a of the inlet passage 38 and the sidewall of the outlet passage 32. Due to this, a thick portion is not provided between the end surface 38a of the inlet passage 38 and the sidewall of the outlet passage 32. That is, two thin regions are defined between the end surface 38a of the inlet passage 38 and the sidewall of the outlet passage 32. By eliminating the thick portion between the inlet passage 38 and the outlet passage 32, molding quality of the housing 30 can be improved. In other words, the hydrogen discharging valve 69 does not need to limit the positions of the inlet passage 38 and the outlet passage 32 to improve the molding quality of the housing 30, and the degree of positional freedom for the inlet passage 38 and the outlet passage 32 can be increased.

OTHER EMBODIMENTS

In the above embodiment, the fuel cell system 100 that comprises the hydrogen discharging valve 69 and the air discharging valve 50 has been described. The structure of the hydrogen discharging valve 69 may be applied to the air discharging valve 50. That is, a valve device similar to the hydrogen discharging valve 69 may be used as the air discharging valve 50.

An essence of the valve device disclosed herein is that the inlet passage is arranged to approach closer the outlet passage toward the downstream side (first discharging unit side), and the heat transfer plate is arranged in the housing along the inlet passage. Due to this, as long as this feature is comprised, other features included in the above embodiment may suitably be selected or modified. For example, the inlet passage may not extend in the substantially horizontal direction, and the heat transfer plate does not have to be disposed below the inlet passage. As an example, the inlet passage may extend in the substantially vertical direction or obliquely upward (or downward). In such a case as well, the heat from the heater can be transmitted to the entirety of the fluid channel as compared to the valve device that does not include the heat transfer plate disposed along the inlet passage.

Further, the end of the heat transfer plate may not be bent, and the end of the heat transfer plate may not be located between the end of the inlet passage and the outlet passage. The inlet passage is designed to approach closer to the outlet passage toward its downstream side, and since the heat transfer plate extends along the inlet passage, the heat from the heater can be applied to the generated water (or frozen fluid) in the downstream-side channel even when the end of the heat transfer plate does not positionally arranged between the endo f the inlet passage and the outlet passage.

Further, the housing is not limited to being constituted of resin, but may for example be constituted of metal or ceramics. Alternatively, the housing may be constituted of two or more materials selected from resin, metal, and ceramics.

Specific examples of the invention disclosed herein have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A valve device configured to open and close a fluid channel, the valve device comprising:
 a housing;

an inlet passage disposed inside the housing and into which a fluid is introduced from outside, wherein the inlet passage extends straight;

a first discharging unit disposed at a downstream end of the inlet passage and on a sidewall of the inlet passage;

an outlet passage disposed inside the housing, communicating with the first discharging unit, extending in a direction different from the inlet passage, and configured to discharge the fluid outside;

a communication chamber disposed above the inlet passage and between the first discharging unit and the outlet passage and communicating with the first discharging unit and the outlet passage;

a valve seat disposed on the first discharging unit;

a valve body configured to contact the valve seat and to open and close the first discharging unit;

a heater; and a heat transfer plate disposed inside the housing, extending along the inlet passage and below the inlet passage, and configured to transfer heat from the heater to the fluid, wherein the inlet passage approaches closer to the outlet passage toward a first discharging unit side where the first discharging unit is disposed, and wherein an end of the heat transfer plate is located between an end of the inlet passage and the outlet passage.

2. A valve device configured to open and close a fluid channel, the valve device comprising:

a housing;

an inlet passage disposed inside the housing and into which a fluid is introduced from outside, wherein the inlet passage extends straight;

a first discharging unit disposed at a downstream end of the inlet passage and on a sidewall of the inlet passage;

an outlet passage disposed inside the housing, communicating with the first discharging unit, extending in a direction different from the inlet passage, and configured to discharge the fluid outside;

a communication chamber disposed above the inlet passage and between the first discharging unit and the outlet passage and communicating with the first discharging unit and the outlet passage;

a valve seat disposed on the first discharging unit;

a valve body configured to contact the valve seat and to open and close the first discharging unit;

a heater; and a heat transfer plate disposed inside the housing, extending along the inlet passage and below the inlet passage, and configured to transfer heat from the heater to the fluid, wherein the inlet passage approaches closer to the outlet passage toward a first discharging unit side where the first discharging unit is disposed, wherein the inlet passage extends in a substantially horizontal direction, and an end of the heat transfer plate is located between an end of the inlet passage and the outlet passage.

3. A valve device configured to open and close a fluid channel, the valve device comprising:

a housing;

an inlet passage disposed inside the housing and into which a fluid is introduced from outside, wherein the inlet passage extends straight;

a first discharging unit disposed at a downstream end of the inlet passage and on a sidewall of the inlet passage;

an outlet passage disposed inside the housing, communicating with the first discharging unit, extending in a direction different from the inlet passage, and configured to discharge the fluid outside;

a communication chamber disposed above the inlet passage and between the first discharging unit and the outlet passage and communicating with the first discharging unit and the outlet passage;

a valve seat disposed on the first discharging unit;

a valve body configured to contact the valve seat and to open and close the first discharging unit;

a heater; and a heat transfer plate disposed inside the housing, extending along the inlet passage and below the inlet passage, and configured to transfer heat from the heater to the fluid, wherein the inlet passage approaches closer to the outlet passage toward a first discharging unit side where the first discharging unit is disposed, and wherein an end of the heat transfer plate is bent and extends upward, and the end of the heat transfer plate is interposed between an end surface of the inlet passage and a sidewall of the outlet passage.

* * * * *